United States Patent [19]

Tsiang

[11] Patent Number: 5,073,621

[45] Date of Patent: Dec. 17, 1991

[54] REMOVAL OF GROUP VIII METAL CATALYST FROM POLYMER CEMENTS BY EXTRACTION WITH AQUEOUS DICARBOXYLIC ACID

[75] Inventor: Raymond C. Tsiang, Sugarland, Tex.

[73] Assignee: Shell Oil Company, Houston, Tex.

[21] Appl. No.: 515,999

[22] Filed: Apr. 16, 1990

[51] Int. Cl.$^5$ .............................................. C08F 6/08
[52] U.S. Cl. .................................. 528/483; 528/486; 528/490; 528/491; 528/499
[58] Field of Search ............... 528/491, 490, 486, 483, 528/499

[56] References Cited

U.S. PATENT DOCUMENTS 2,893,982  7/1959  Campbell ........................ 260/85.1
4,595,749  6/1986  Hoxmeier ........................ 528/483

Primary Examiner—Joseph L. Schofer
Assistant Examiner—Tom Weber

[57] ABSTRACT

A process is provided for removing Group VIII metal hydrogenation catalyst residue from a polymer which comprises oxidizing the hydrogenation catalyst residue in the polymer, contacting the polymer with an aqueous solution of dicarboxylic acid and separating the hydrogenation catalyst residue from the polymer. Preferred dicarboxylic acids include adipic and azelaic acids. The amount of water contacted with the polymer cement is less than that which would form an aqueous phase. Solid particulates comprising hydrogenation catalyst metal form within minutes upon the addition of the aqueous dicarboxylic acid to the polymer cement.

24 Claims, No Drawings

REMOVAL OF GROUP VIII METAL CATALYST FROM POLYMER CEMENTS BY EXTRACTION WITH AQUEOUS DICARBOXYLIC ACID

FIELD OF THE INVENTION

This invention relates to a process to prepare hydrogenated polymers. More particularly, the invention relates to the removal of residues of hydrogenation catalysts from solutions comprising hydrogenated polymers.

BACKGROUND OF THE INVENTION

The uses of polymeric materials, including diolefin polymers, continues to grow rapidly in such diverse areas as protective paint coverings, wire insulations, structural panels for automobiles, piping and lubricating oil viscosity index improvers. In many of these applications, the stability of the polymer is of paramount importance. Hydrogenation of diolefin polymers greatly improves the stability of these polymers against oxidative, thermal, and ultra violet degradation. Polymer hydrogenation processes have therefore been studied for many years as a method to prepare novel materials with excellent stability and other desirable properties. Early processes utilized heterogeneous catalysts which were known to be useful for hydrogenation of low molecular weight olefins and aromatics. These catalysts included catalysts such as nickel on kieselguhr. A fine catalyst powder was preferred and large amounts of catalysts were required to complete the hydrogenation in a reasonable amount of time. Such processes were only partially successful, since the reaction requires the diffusion of the polymer molecules into the pores of the catalyst, where the active nickel metal was present. This is a slow process when hydrogenating polymers.

Discovery of nickel octoate/triethyl aluminum hydrogenation catalyst systems enabled rapid hydrogenation of polymers. These processes utilize the catalyst as a colloidal suspension in polymer containing solutions. This type of catalyst is referred to as a homogeneous catalyst. Such a process has been used for a number of years to prepare hydrogenated butadiene-styrene polymers. U.S. Pat. No. 3,554,991 describes an exemplary process. Besides nickel, Group VIII metals in general will function as the active metal in these systems, and in particular, iron, cobalt, and palladium are known to be acceptable.

Pore diffusion is not a limitation with homogeneous catalysts and the hydrogenation process is rapid and complete in a matter of minutes. However, removal of the catalyst from the polymer product is necessary because metals, and particularly nickel, which remain with the polymer catalyze degradation of the polymer product. The removal of the catalyst from polymer solutions is commonly accomplished by the addition of an ammonium phosphate-water solution and air and then filtration of solids which contain the catalyst particals from the polymer solution. The air is utilized to oxidize the nickel to a divalent state.

Alternative methods to remove hydrogenation catalyst residues from cements of hydrogenated polymers include treatment with an amine compound wherein the amine is either a chloride salt or a diamine having an alkyl group of 1 to 12 carbon atoms as disclosed by U.S. Pat. No. 4,098,991; and treatment with a non-aqueous acid followed by neutralization with an anhydrous base and filtration, as disclosed by U.S. Pat. No. 4,028,485.

Some of these catalyst removal systems are undesirable because those processes require relatively expensive metallurgy due to the corrosive nature of the nickel removal compounds. Many also produce an aqueous acidic sludge containing the catalyst and residues of the treatment chemicals. It can be difficult and expensive to dispose of this sludge.

Treatment of polymer cements to remove hydrogenation catalyst residues can also be accomplished by contacting the cement with dicarboxylic acid and an oxidant, as disclosed in U.S. Pat. No. 4,595,749. In this process, the dicarboxylic acid is first dissolved in toluene, ethanol, or another solvent for the polymer. This method is advantageous because it can be accomplished in equipment fabricated from inexpensive materials. This process also does not produce an acidic aqueous stream which requires disposal because the catalyst residue metals and acid precipitate directly from the polymer cement. However, it has been found that this process has the disadvantage of requiring an excessive amount of time for the precipitate to form.

It is therefore an object of this invention to provide a process to remove Group VIII metal containing hydrogenation catalyst residue from polymer cements. It is a further object of this invention to provide a process to remove hydrogenation catalyst residue from polymer cements which does not produce an aqueous phase of reactants. It is another object to provide a process where hydrogenation catalyst residue can be removed from polymer cements by precipitation of the residues wherein the precipitation is rapid and results in solid particles which are easily removed from the polymer cements. It is another object of this invention to provide a process which is capable of removing hydrogenation catalyst residues from polymer cements to a level of 10 ppm of Group VIII metals or less based on the polymer.

SUMMARY OF THE INVENTION

The objects of this invention are accomplished by a process comprising the steps of providing a hydrogenation catalyst residue containing polymer cement, oxidizing the hydrogenation catalyst residue, contacting the oxidized hydrogenation catalyst residue with an aqueous solution of dicarboxylic acid and recovering a polymer cement comprising less than 10 ppm by weight, based on the polymer, of Group VIII metals.

In a preferred embodiment, the oxidation is accomplished using a peroxide before the polymer cement is contacted with the dicarboxylic acid, and the polymer cement is recovered by filtration from the resulting precipitated hydrogenation catalyst metal particles. Preferred dicarboxylic acids include adipic and azelaic acids. The amount of water contacted with the polymer cement is less than that which would form a separate aqueous phase which eliminates the need to separate two liquid phases. Solid particulates comprising hydrogenation catalyst metal which are readily seperated from the cement form within minutes upon the addition of the aqueous dicarboxylic acid to the polymer cement.

DETAILED DESCRIPTION OF THE INVENTION

The polymer cements of the present invention preferably comprise from 1 to about 30 parts by weight of a polymer, and more preferably comprise from about 10 to about 12 parts by weight of polymer, based on the total amount of cement, in an inert hydrocarbon solvent. The hydrocarbon solvent may be an aliphatic solvent or an aromatic solvent and typically comprises hydrocarbons having from 4 to 20 carbon atoms. The polymer is a partially, selectively, or totally hydrogenated polymer. The present invention does not depend upon the type of nature of the polymer. The polymer may therefore be a thermoplastic polymer, or an elastomeric polymer and may have a molecular weight which varies between wide limits. Most typically, polymers which are benefited by hydrogenation are those comprising polymerized conjugated diolefins. These conjugated diolefin containing polymers are therefore preferred for the practice of the present invention. They may be prepared by radical, anionic or cationic polymerization and may be copolymers with other monomer units. The copolymers may be random, block, or tapered, and may have structures that are linear, branched or radial.

In a most preferred embodiment, the polymer is an anionically polymerized conjugated diolefin polymer which was polymerized in an inert solvent, and then hydrogenated in the same solvent to form the hydrogenation catalyst residue containing polymer cement.

When an anionic initiator is used, polymers may be prepared by contacting the monomers with an organoalkali metal compound in a suitable solvent at a temperature within the range from about $-100°$ C. to about 300° C., preferably at a temperature within the range from about 0° C. to about 100° C. Particularly effective polymerization initiators are organolithium compounds having the general formula:

$$RLi_n$$

Wherein  R is an aliphatic, cycloaliphatic or aromatic hydrocarbon radical having from one to about 20 carbon atoms; and n is an integer of 1 to 4.

When the polymer is a block copolymer, the copolymer is preferably a styrene-conjugated diolefin block copolymer. This is due to the thermoplastic and elastomeric nature of these polymers. The polystyrene, being incompatible with the polyconjugated olefins, form separate domains, and these domains have relatively high glass transition temperatures. Above the glass transition temperatures of the polystyrene domains the polymer is in a melt phase and can be molded, extruded or blended with other components. Below the glass transition temperature of the polystyrene the polystyrene domains are hard and act as physical crosslinks between the rubbery conjugated diolefin chains. This results in excellent elastomer properties along with reprocessability.

The polymer of the present invention is typically contacted with hydrogenation catalyst and hydrogen in an inert solution with a solvent such as cyclohexane, normal hexane, pentane, heptane or octane. When the hydrogenation conditions are not sever enough to saturate aromatics, solvents such as toluene, xylene and benzene may be used.

The hydrogenation catalysts themselves have complex structures which are not well understood and are therefore usually described by the process used to prepare them. The hydrogenation catalyst can be prepared by combining a Group VIII metal carboxylate or alkoxide ("catalyst") with an alkyl or hydride of a metal selected from Groups I-A, II-A and III-B of Medeleev's Periodic Table of Elements ("cocatalyst"). The preparation of such catalysts is taught in U.S. Pat. Nos. 3,591,064 and 4,028,485, which are incorporated herein by reference. For effective hydrogenation under reasonable hydrogen pressures, temperatures and times, concentrations of from about $1 \times 10^{-3}$ to about $20 \times 10^{-3}$ mmoles of Group VIII metal per gram of polymer and cocatalyst to catalyst ratios of between about 1 and about 4 are acceptable.

The catalyst metals which are preferred include iron, cobalt, nickel and palladium because of the availability of ample data on the performance of these metals in hydrogenation catalysts. Nickel and cobalt are most preferred. Iron is not most preferred because it is less active than the others and palladium is not most preferred because it is more expensive than nickel and cobalt.

Hydrides or alkyls of lithium, magnesium or aluminum are preferred cocatalysts due to the excellent hydrogenation activity of the systems containing these cocatalysts.

The hydrogenation catalysts are insoluble in the polymer cements and form a colloidal suspension. They are typically although imprecisely referred to as "homogeneous" catalyst systems to differentiate them from hydrogenation catalysts which are porous solids.

Hydrogenation catalyst residues in polymer cements comprise Group VIII metal ions in a state of zero valence. This is indicated by a black color imparted to the polymer cement by nickel hydrogenation catalyst residue. Upon oxidation, the black color will turn green, indication that the valence of the nickel has become plus two. Oxidizing these metal ions enhances the agglomeration and precipitation of the metal particles by dicarboxylic acid because the dicarboxylic acid racts very slowly with the metal ions which have a valence of zero.

The hydrogenation catalyst residue metals may be oxidized by any known method of oxidizing these metals. It is preferred that they be oxidized by contacting the polymer cement with an oxidizer such as molecular oxygen or a peroxide. The peroxide may be hydrogen peroxide or an organic peroxide.

When oxygen is used to oxidize the catalyst metals, amounts may range from 0.1 to 100 moles of oxygen per mole of metal, but a molar ratio between 0.1 and 5 is preferred. Hydrogen peroxide requirements may range from 0.1 to 100 moles per mole of metal in the hydrogenation product, with 0.1 to 5 the preferred range of the molar ratio. The quantities of alkyl hydroperoxides needed range from 0.1 to 100 moles per mole of metal, but preferably a molar ratio of 0.1 to 5 should be used.

Hydrogen peroxide may be added as an aqueous solution of from 1 to about 40 percent hydrogen peroxide in water. Organic peroxides such as alkyl or aryl hydroperoxides suitable for this invention may be primary, secondary or tertiary alkyl hydroperoxides, although the tertiary alkyl hydroperoxides are preferred. Examples are ethyl peroxide, butyl hydroperoxides, isopropyl hydroperoxide, tertiary butyl hydroperoxide and the like. Tertiaryl butyl hydroperoxide is a preferred oxidant.

The product may be contacted with oxidant before, or simultaneously with treatment with the acid. The oxidant may be bubbled through the polymer cement, or it may be added as a liquid or solution, as with hydrogen peroxide or tertiary alkyl hydroperoxide. When oxidant is bubbled or sparged through the polymer cement the oxidant may be a gas stream comprising a major portion of nitrogen and a minor portion of oxygen, such as air.

The dicarboxylic acid can be any organic acid containing two or more carboxylic acid groups. It has been theorized that dicarboxylic acids remove nickel and other metal ions from polymer cements by forming polymeric chains with the metal ions linking carboxylic acid groups from two different dicarboxylic acid molecules. The dicarboxylic acid preferably comprises from about 2 to about 12 carbon atoms and preferably has carboxylic acid functionality at terminals of carbon atom chains.

The only significant limitation on the dicarboxylic acids which may be utilized is that the dicarboxylic acids must be relatively soluble in water. The dicarboxylic acid must be soluable to the extent of 1 gram or more per 100 grams of water and more preferably 5 grams or more per 100 grams of water. The water may be heated to enable dissolution of this amount of dicarboxylic acid and is preferably heated to about 50° C. or greater to ensure dissolution of the dicarboxylic acid.

Acceptable dicarboxylic acids include, but are not limited to, succinic, oxalic, tartaric, malonic, fumaric, maleic, sebacic, adipic, azelaic and phthalic acids.

Disolving the dicarboxylic acid in water before contacting the cement with the dicarboxylic acid has been found to be critical for rapid formation of hydrogenation catalyst residue precipitates. Without predissolving the dicarboxylic acid in water particulates which can be removed from the polymer cement form, but they form at a rate which is too slow for commercial application of the process.

The amount of dicarboxylic acid which is utilized is preferably more than stoichiometric to the metal ions to be removed from the polymer cement. An amount between about 100% and about 200% of stoichiometric is most prefered. Excess dicarboxylic acid needlessly contaminates the polymer cement, and an lower amount of dicarboxylic acid results in insufficient metal ion removal.

The treated polymer cement may be recovered from the polymer cement mixture by any known means to separate solids from viscous liquids. Centrifugal means such as centrifuges or cyclones may be utilized. Filtering, preferably in the presence of a filter aid, may also be utilized, along with gravity settlement such as decantation or parallel plate separators. Filtering in the presence of a filter aid is preferred because this method is known to be effective to separate fine particles from polymer cements.

The use of aqueous solutions of dicarboxylic acids results in much faster precipitation of hydrogenation catalyst residues than the use of solutions of dicarboxylic acids in toluene or ethanol as taught by U.S. Pat. No. 4,595,749. The examples in '749 demonstrated acceptable gravity settlement of particulates, but the samples stood over night for the separation to become evident. With the present invention, the particulates form and solid phase precipitation of the catalyst residue containing particles from the polymer cement is evident within about five minutes.

EXAMPLES

Two hydrogenation catalyst residue containing polymer cements were prepared by anionically polymerizing a styrene-butadiene block copolymer in cyclohexane and then hydrogenating the polymer in the same solution. The cements varied in that one cement contained 12 percent by weight polymer and the other contained 16 percent by weight polymer. A butyl lithium initiator was utilized to anionically polymerize the polymers. The polymer was a triblock copolymer having polystyrene end blocks of number average molecular weights of about 7500 each. The midblock was polybutadiene with a number average molecular weight of about 37,000. The polymerization was terminated by adding a small amount of methanol.

The polymer solutions were then hydrogenated by adding nickel (2-ethylhexanoate) and triethylaluminum. The solution was then held at about 80° C. under about 700 psia hydrogen partial pressure for about three hours to accomplish hydrogenation of the polymer. These cements were then divided and treated as described below.

Hydrogen peroxide as either a 3 or a 30 percent by weight solution in water was used to oxidize the catalyst metals. Sufficient hydrogen peroxide solution was added to result in a molar ratio of nickel to peroxide of about 1:4. The cements turned from black to green within about five minutes.

Adipic acid was added to the oxidized polymer cement as a as a 5 percent by weight solution in 50° C. deionized water. Azalaic acid was utilized as a 5 percent by weight solution in 75° C. deionized water. As comparative examples, the acids were added to the polymer cements as powders. In each sample, the acid was added in about a 25% excess of stoichiometric to the nickel. After the acids were added, the solids were allowed to settle. Table 1 lists the cements used, the acids used, the temperatures of the cements at the time the acids were added and during the precipitation periods, the hydrogen peroxide concentrations used, the cement nickel and aluminum concentrations before and after the treatment, and observations of the rate and form of the precipitate.

TABLE 1

| Sample | Polymer in Cement % wt | °C. | Acid type | Acid form | H2O2 Conc. % wt | Sol Feed - Product (ppm-based on the polymer cement) | | | | Precipitate | |
|---|---|---|---|---|---|---|---|---|---|---|---|
| | | | | | | Ni | Al | Ni | Al | Rate | Form |
| 1 | 12 | 25 | adipic | sol. | 3 | 150 | 166 | 0.58 | 4.35 | Fast | Fluffy |
| 2 | 12 | 60 | adipic | sol. | 3 | 150 | 166 | 0. | 0. | Fast | Fluffy |
| 3 | 16 | 60 | adipic | sol. | 3 | 225 | 183 | 0. | 0. | Fast | Fluffy |
| 4 | 12 | 70 | adipic | pow. | 3 | 150 | 166 | 0.05 | 0. | Slow | Dense |
| 5 | 16 | 25 | adipic | sol. | 3 | 225 | 183 | 0.03 | 1. | Fast | Fluffy |
| 6 | 12 | 70 | adipic | pow. | 30 | 150 | 166 | 0. | 3.85 | Slow | Dense |
| 7 | 12 | 25 | adipic | sol. | 3 | 225 | 183 | 0.08 | 4.48 | Fast | Fluffy |
| 8 | 12 | 25 | azel. | sol. | 3 | 150 | 166 | 0.10 | 5.27 | Fast | Fluffy |
| 9 | 12 | 25 | adipic | sol. | 30 | 150 | 166 | 0. | 0. | Fast | Fluffy |
| 10 | 16 | 25 | adipic | pow. | 3 | 225 | 183 | 0.73 | 0.98 | Slow | Dense |
| 11 | 16 | 70 | azel. | pow. | 3 | 225 | 183 | 0. | 3.35 | Slow | Dense |

TABLE 1-continued

| Sample | Polymer in Cement % wt | °C. | Acid type | Acid form | H2O2 Conc. % wt | Sol Feed - Product (ppm-based on the polymer cement) | | | | Precipitate | |
|---|---|---|---|---|---|---|---|---|---|---|---|
| | | | | | | Ni | Al | Ni | Al | Rate | Form |
| 12 | 12 | 25 | adipic | sol. | 3 | 150 | 166 | 0. | 0. | Fast | Fluffy |

From Table 1 it can be seen that when the acid is added to the polymer cement in the form of a powder the precipitate of the catalyst metals forms slowly and forms as a dense precipitate. The formation of the precipitate is independent of the concentration of the peroxide added and the temperature of the cement when the acid is added. All twelve samples resulted in useful treated cements in that each had less that 10 ppm (on polymer basis) of Group VIII metal.

I claim:

1. A process to remove Group VIII metal containing hydrogenation catalyst residue from a polymer which has been catalytically hydrogenated, the process comprising the steps of:
   (a) oxidizing the hydrogenation catalyst residue in the polymer;
   (b) contacting the polymer with an aqueous solution of a dicarboxylic acid;
   (c) allowing a hydrogenation catalyst residue precipitate to form; and
   (d) separating the hydrogenation catalyst residue from the polymer.

2. The process of claim 1 wherein the hydrogenation catalyst was prepared by combining a Group VIII metal carboxylate or alkoxide with an alkyl or hydride of a metal selected from Groups I-A, II-A and III-B of Medeleev's Periodic Table of Elements.

3. The process of claim 1 wherein the hydrogenation catalyst is prepared by combining a component selected from the group comsisting of nickel carboxylate, nickel alkoxide, cobalt carboxylate, iron alkoxide, palladium carboxylate and palladium alkoxide with a component selected from the group consisting of lithium alkyl, lithium hydrate, magnesium alkyl, magnesium hydrate, aluminum alkyl and aluminum hydrate.

4. The process of claim 1 wherein the hydrogenation catalyst is prepared by combining nickel (2-ethylhexanoate) and an aluminum alkyl.

5. The process of claim 4 wherein the aluminum alkyl is triethylaluminum.

6. The process of claim 1 wherein the dicarboxylic acid is selected from the group consisting of adipic acid and azelaic acid.

7. The process of claim 1 wherein the hydrogenation catalyst residue is in the form of a colloidal suspension.

8. The process of claim 1 wherein the polymer is in a solution of from about 1 to about 30 percent by weight polymer based on the total polymer solution, in an inert solvent.

9. The process of claim 8 wherein the inert solvent is selected from the group comprising cyclohexane, toluene, hexane, and benzene.

10. The process of claim 1 wherein the polymer is a polymer which comprised conjugated diolefin monomer units prior to being hydrogenated.

11. The process of claim 10 wherein the polymer was, before hydrogenation, a copolymer comprising conjugated diolefin monomer units and styrene monomer units.

12. The process of claim 11 wherein the copolymer was a block copolymer comprising at least one block which comprises monomer units of conjugated diolefins and at least one block which comprises styrene monomer units.

13. The process of claim 8 wherein the polymer is anionically polymerized in the inert solvent prior to hydrogenation of the polymer.

14. The process of claim 1 oxidation is accomplished by contacting the polymer with hydrogen peroxide.

15. The process of claim 1 wherein the oxidization is performed by contacting the polymer with oxygen.

16. The process of claim 15 wherein the oxygen is contacted with the hydrogenation catalyst residue containing polymer cement by bubbling a gas stream comprising oxygen through the polymer cement.

17. The process of claim 16 wherein the gas stream comprises a major portion of nitrogen and a minor portion of oxygen.

18. The process of claim 14 wherein the oxidation is accomplished by contacting the polymer with an alkyl hydroperoxide.

19. The process of claim 1 wherein the oxidation is accomplished when the polymer is contacting the dicarboxylic acid.

20. The process of claim 19 wherein the oxidation is accomplished by contacting the polymer with a peroxide.

21. The process of claim 1 wherein the polymer is separated from the hydrogenation catalyst residue by filtration.

22. The process of claim 21 wherein the filtration is performed utilizing a filter aid.

23. The process of claim 1 wherein the polymer is separated from the hydrogenation catalyst residue by gravity settlement.

24. The process of claim 1 wherein the polymer is separated from the hydrogenation catalyst residue by centrifugation.

* * * * *